US009720738B2

(12) United States Patent
Anghel et al.

(10) Patent No.: US 9,720,738 B2
(45) Date of Patent: Aug. 1, 2017

(54) DATACENTER SCHEDULING OF APPLICATIONS USING MACHINE LEARNING TECHNIQUES

(71) Applicant: International Business Machines Corporation, Armonk, NY (US)

(72) Inventors: Andreea S. Anghel, Adliswil (CH); Bogdan Prisacari, Adliswil (CH); German Rodriguez Herrera, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 14/682,253

(22) Filed: Apr. 9, 2015

(65) Prior Publication Data
US 2016/0299785 A1 Oct. 13, 2016

(51) Int. Cl.
*G06F 9/46* (2006.01)
*G06F 9/50* (2006.01)
*G06N 99/00* (2010.01)
*G06F 17/30* (2006.01)

(52) U.S. Cl.
CPC ...... *G06F 9/5027* (2013.01); *G06F 17/30598* (2013.01); *G06N 99/005* (2013.01)

(58) Field of Classification Search
CPC .......... G06N 3/02; G06N 3/08; G06N 99/005; G06F 9/5044; G06F 3/126; G06F 9/5027; G06F 17/30598
USPC ................................................ 718/102, 104
See application file for complete search history.

(56) References Cited

U.S. PATENT DOCUMENTS

| 8,719,831 | B2* | 5/2014 | Radmilac | G06F 9/5083 718/100 |
| 9,081,618 | B2* | 7/2015 | Kiehn | G06F 9/5044 |
| 9,098,343 | B2* | 8/2015 | Celis | G06F 9/5066 |
| 2005/0071107 | A1* | 3/2005 | Betzler | G06F 9/5061 702/108 |
| 2007/0143765 | A1* | 6/2007 | Aridor | G06F 9/5011 718/104 |

(Continued)

OTHER PUBLICATIONS

Bhatele et al., "There Goes the Neighborhood: Performance Degradation due to Nearby Jobs", Apr. 26, 2013, International Conference for High Performance Computing, Networking, Storage and Analysis, Denver, CO, United States, Nov. 17, 2013 through Nov. 22, 2013, 12 pages.

(Continued)

*Primary Examiner* — Benjamin Wu
*Assistant Examiner* — Willy W Huaracha
(74) *Attorney, Agent, or Firm* — A. Imtiaz Billah (57) ABSTRACT

A computer-implemented method including: (i) receiving a computational task to be processed by the datacenter environment; (ii) receiving a set of computational task parameters, The computational task parameters specifying characteristics of the computational task to be processed; (iii) receiving a set of computing entity parameters, The computing entity parameters specifying characteristics of the computing entities; (iv) transmitting the computational task parameters and the computing entity parameters to a scheduling entity; and (v) selecting one or more computing entities of The plurality of computing entities for processing the computational task by the scheduling entity, based on various factors.

14 Claims, 4 Drawing Sheets

(56) References Cited

U.S. PATENT DOCUMENTS

| | | | | |
|---|---|---|---|---|
| 2012/0016642 A1* | 1/2012 | Li | ................... | G06Q 30/02 |
| | | | | 703/2 |
| 2014/0222730 A1* | 8/2014 | Vasseur | ............. | G06N 99/005 |
| | | | | 706/12 |
| 2014/0289733 A1* | 9/2014 | Fritz | ................ | G06F 9/5066 |
| | | | | 718/104 |
| 2014/0298343 A1* | 10/2014 | Rajan | ............... | G06F 9/5027 |
| | | | | 718/102 |

OTHER PUBLICATIONS

Kambadur et al., "Measuring Interference Between Live Datacenter Applications", SC12, Nov. 10-16, 2012, Salt Lake City, Utah, USA, 978-1-4673-0806-9/12/, © 2012 IEEE, 12 pages.

Langford et al., "The Epoch-Greedy Algorithm for Contextual Multi-armed Bandits", Advances in Neural Information Processing Systems 20 (NIPS 2007), pp. 1-8.

Li et al., "A Contextual-Bandit Approach to Personalized News Article Recommendation", WWW 2010, Apr. 26-30, 2010, Raleigh, North Carolina, USA, ACM 978-1-60558-799-8/10/04, pp. 661-670.

Srinivasan et al., "A Minimal Fragmentation Algorithm for Task Allocation in Mesh-Connected Multicomputers", Manuscript received Oct. 31, 2004, pp. 1-8.

Subhlok et al., "Impact of Job Mix on Optimizations for Space Sharing Schedulers", Proceedings of the 1996 ACM/IEEE Conference on Supercomputing (SC'96) 0-89791-854-1/96, pp. 1-18.

Weisser et al., "Optimizing Job Placement on the Cray XT3", CUG 2006 Proceedings, pp. 1-9.

\* cited by examiner

DATACENTER SCHEDULING OF APPLICATIONS USING MACHINE LEARNING TECHNIQUES

BACKGROUND

The invention relates to automated datacenter scheduling of applications, and further relates to machine learning techniques.

In datacenter environments, application scheduling using virtual machines is a known technique. In application scheduling using virtual machines, decisions are made regarding which specific computing entity: (i) a certain virtual machine should be instantiated; and/or (ii) an application should be executed.

SUMMARY

According to an aspect of the present invention, there is a method, computer program product and/or system, for scheduling a computational task in a datacenter environment that includes a plurality of computing entities, that performs the following operations (not necessarily in the following order): (i) determining feedback information based, at least in part, on: (a) historical selections of computing entities of the plurality of computing entities for processing historical computing tasks, and (b) historical processing results associated with the historical computing tasks as processed by the historical computing entity selections; (ii) receiving data corresponding to: (a) a new computational task to be processed by the datacenter environment, (b) associated computational task parameters specifying characteristics of the new computational task, and (c) a set of computing entity parameters, The computing entity parameters specifying characteristics of the computing entities of the plurality of computing entities; and (iii) selecting, by machine logic of a scheduling entity, one or more computing entities of The plurality of computing entities as selected computing entity(ies) for processing the new computational task based, at least in part, upon: (a) the set of computational task parameters, (b) the set of computing entity parameters, and (c) the feedback information.

BRIEF DESCRIPTION OF THE DRAWINGS

Embodiments are described with reference to the attached drawings, in which.

DETAILED DESCRIPTION

Some embodiments relate to a computer-implemented method for scheduling computational tasks. Some embodiments may be advantageous because an improved computational task scheduling within the datacenter environment may be achieved based on an advanced machine learning technique taking not only actual computational task parameters and computing entity parameters into account, but also knowledge obtained from previous scheduling decisions. This Detailed Description section is divided into the following sub-sections: (i) The Hardware and Software Environment; (ii) Embodiment(s) & Discussion; and (iii) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to some embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
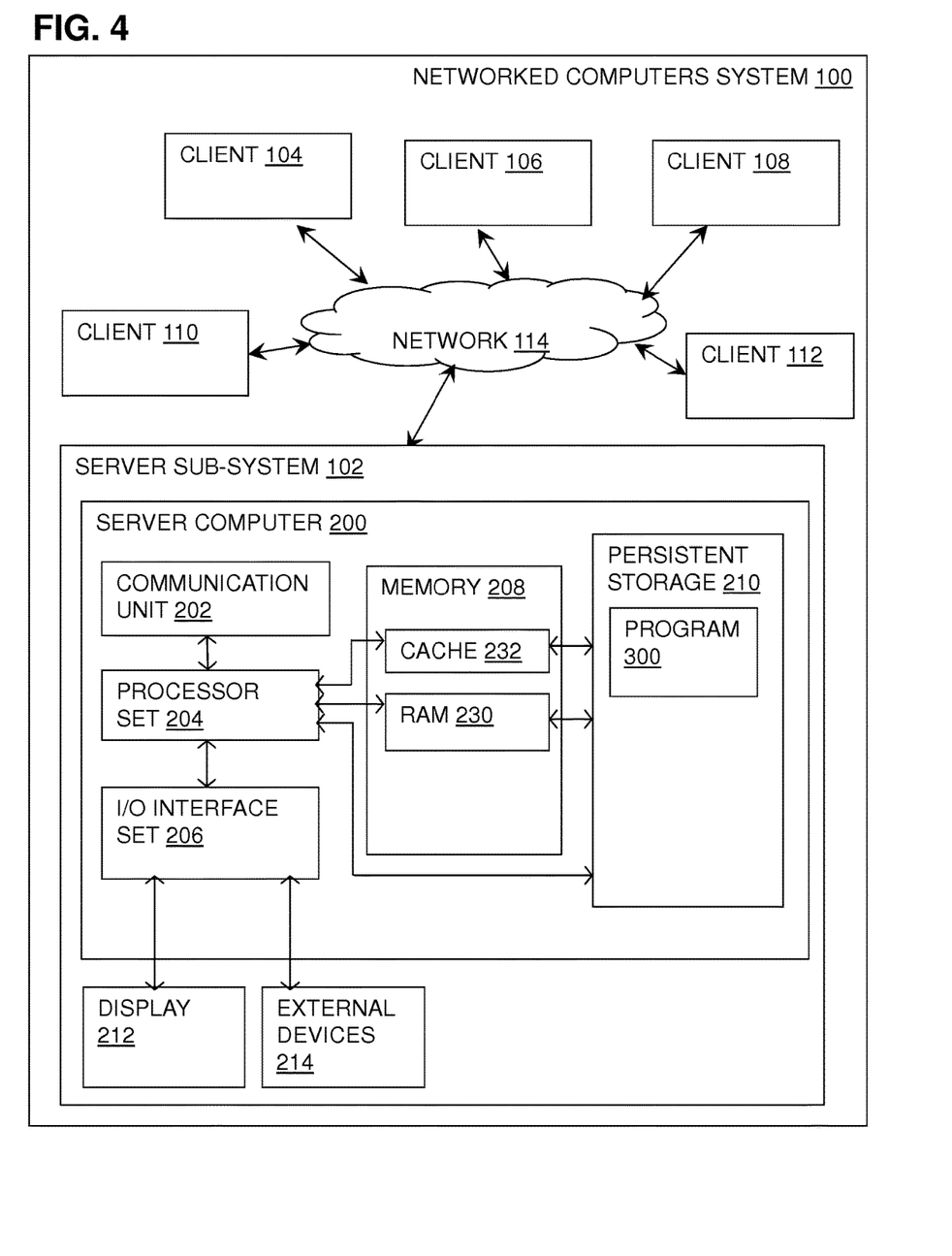
FIG. 4 is a block diagram of a system of networked computers which provides an example of a hardware and software environment suitable for implementing various embodiments of the present invention.

An embodiment of a possible hardware and software environment for software and/or methods according to the present invention will now be described in detail with reference to the Figures. FIG. 4 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Embodiment(s) & Discussion

Some embodiments recognize that, in systems that schedule applications using virtual machines, making decisions regarding which specific computing entity will be used may not always be easy to make by machine logic due to heterogeneity in several orthogonal dimensions including the following: (i) computing entities exhibit significantly different characteristics in terms of power efficiency, computing capability (single thread operations per second and number of physical multithreading capability), 10 speed and capacity (memory/storage/network subsystems), etc.; (ii) applications/virtual machines exhibit significantly different characteristics in terms of computation and 10 (memory/storage/network) requirements, running time, number of processes or even nodes, etc.; and/or (iii) computing entities at a given point in time can exhibit significantly different characteristics in terms of resource usage by applications running in parallel to the application to be scheduled.

According to some embodiments, the scheduling entity continuously refines the scheduling process by integrating previous feedback information. Thereby, the scheduling process could be continuously evolved by considering multiple feedback information derived at different points of time in the past.

According to some embodiments, the scheduling entity includes a self-learning scheduling mechanism that takes a plurality of feedback information derived from previous computational task schedulings into account for selecting the one or more computing entities. For example, the scheduling entity may comprise a storage which stores information regarding to previous decisions in association with reward information received from the datacenter environment during or after the processing of a computing task underlying the decision. The scheduling entity may be adapted to consider information derived from previous decisions for making the current decision. Thereby, an improved computational task scheduling may be achieved which refines its scheduling decisions over time.

According to some embodiments, the self-learning scheduling mechanism is adapted to take computational task parameters and computing entity parameters used in previous computational task schedulings into account for selecting the one or more computing entities. For example, the self-learning scheduling mechanism may compare the computational task parameters of the current computational task to be processed with prior computational task parameters of computational tasks being scheduled in the past in order to find out whether an identical or similar computational task has been processed in the past. Similarly, the self-learning scheduling mechanism may compare previous computing entity parameters with actual computing entity parameters in order to find the optimal computing entity on which the computational task should be processed. Thereby, based on upper-mentioned parameters, previous scheduling tasks may be compared with the current scheduling task and based on the feedback information an improved scheduling decision may be made for the current scheduling task.

According to some embodiments, the scheduling entity includes a multi-armed bandit model for selecting the one or more computing entities. Advantageously, multi-armed bandit models may provide improved scheduling decision results because they are adapted to consider any of several different criteria for choosing the scheduling decision and because they are formally proven to guarantee an eventual improvement in the reward that their decisions incur.

According to some embodiments, the scheduling entity includes a contextual self-learning mechanism taking feedback information into account, which information was derived from processing of computational tasks with computational task parameters that are similar to computational task parameters of the computational task to be currently scheduled. So, in other words, not only scheduling decisions referring to identical computational tasks but also scheduling decisions referring to similar computational tasks are taken into account for making the current scheduling decision. Thereby, an improved self-learning scheduling algorithm may be achieved.

According to some embodiments, the scheduling entity includes a contextual self-learning mechanism taking feedback information into account which was derived from processing of computational tasks on computing entities with computing entity parameters which are similar to computing entity parameters of the computing entity to be currently selected. So, in other words, not only schedulings deployed on identical computing entities but also scheduling decisions deployed on similar computing entities are taken into account for making the current scheduling decision. Thereby, an improved self-learning scheduling algorithm may be achieved.

According to some embodiments, the scheduling entity comprises a parameter processing entity, the parameter processing entity receiving the computational task parameters and selecting a subset of the computational task parameters which are taken into account for selecting one or more computing entities. Thereby, a subset of computational task parameters is obtained which is used for making the scheduling decision. According to some embodiments, the parameter processing entity may be adapted to modify the computational task parameters for making the scheduling decision.

According to some embodiments, the parameter processing entity is adapted to assign weighting parameters to the computational task parameters in order to select one or more computing entities based on computational task parameters weighted by the weighting parameters. By means of the weighting parameters it might be possible to increase the effect of one or more computational task parameters, respectively, decrease the effect of other computational task parameters. Thereby, it is possible to weight the effect of certain computational task parameters when making the scheduling decision.

According to some embodiments, the parameter processing entity is adapted to modify computational task parameters by applying an arithmetic operation or generate a modified computational task parameter by combining two or more computational task parameters based on an arithmetic operation or adapt at least one computational task parameter and add The adapted computational task parameter alongside the original computational task parameter. By modifying and/or combining multiple computational task parameters, the machine learning process may be improved.

According to some embodiments, the scheduling entity comprises a parameter processing entity, the parameter processing entity receiving the computing entity parameters and selecting a subset of the computing entity parameters which are taken into account for selecting one or more computing entities. Thereby, a subset of computing entity parameters is obtained which is used for making the scheduling decision. According to some embodiments, the parameter processing entity may be adapted to modify the computing entity parameters for making the scheduling decision.

According to some embodiments, the parameter processing entity is adapted to assign weighting parameters to the computing entity parameters in order to select one or more computing entities based on computing entity parameters weighted by the weighting parameters. By means of the weighting parameters it might be possible to increase the effect of one or more computing entity parameters (for example, CPU clock, size of memory etc.), respectively, decrease the effect of other computing entity parameters. Thereby, it might be possible to weight the effect of certain computing entity parameters when making the scheduling decision.

According to some embodiments, the parameter processing entity is adapted to modify computing entity parameters by applying an arithmetic operation or generate a modified computing entity parameter by combining two or more computing entity parameters based on an arithmetic operation or adapt at least one computing entity parameter and add The adapted computing entity parameter alongside the original computing entity parameter. By modifying and/or combining multiple computing entity parameters, the machine learning process may be improved.

According to some embodiments, a subset of computing entities out of the plurality of computing entities is selected based on computational task requirements. The computational task requirements may be, for example, minimum requirements for running a certain computational task, for example, minimum memory requirements for running an application. So, based on the computational task requirements it is possible to exclude computing entities which do not fulfil the computational task requirements.

According to some embodiments, the selecting of one or more computing entities is based on one or more optimization characteristics, the optimization characteristics defining one or more datacenter parameters to be improved by means of the scheduling entity. For example, by means of the scheduling decisions, the power efficiency of the datacenter or the processing speed should be optimized. In order to achieve the objective, the scheduling entity may make scheduling decisions which take into account the objective, i.e. schedule a certain computational task at a computing entity which is very power efficient, respectively, shows high processing power.

It will be understood that the term "datacenter", when used in this specification, specifies any computing environment which shows a plurality of computing entities for processing computational tasks. The computing entities may be coupled via network connections in order to exchange information.

It will be further understood that the term "computing entity", when used in this specification, specifies any kind of data processing entity which is adapted to receive a computational task and process The computational task. For example, but without limitation, a computing entity may be a computer, a server or any other processing unit.

It will be further understood that the term "computational task", when used in this specification, specifies any kind of task to be processed by a computing entity, for example, but without limitation an application, a virtual machine or any other software or part of software.

It will be further understood that the term "computing entity parameter", when used in this specification, specifies any kind of parameter which may be used for specifying a computing entity. For example, but without limitation, computing entity parameter may indicate the processing power (for example, CPU clock, CPU architecture, number of CPU cores etc.), the memory size, etc.

It will be further understood that the term "computational task parameter", when used in this specification, specifies any kind of parameter which may be used for specifying a computational task. For example, but without limitation, computational task parameter may indicate the total number of instructions, memory requirements, CPU requirements, etc.

If not explicitly indicated otherwise, embodiments of the invention can be freely combined with each other.

Figure 1:
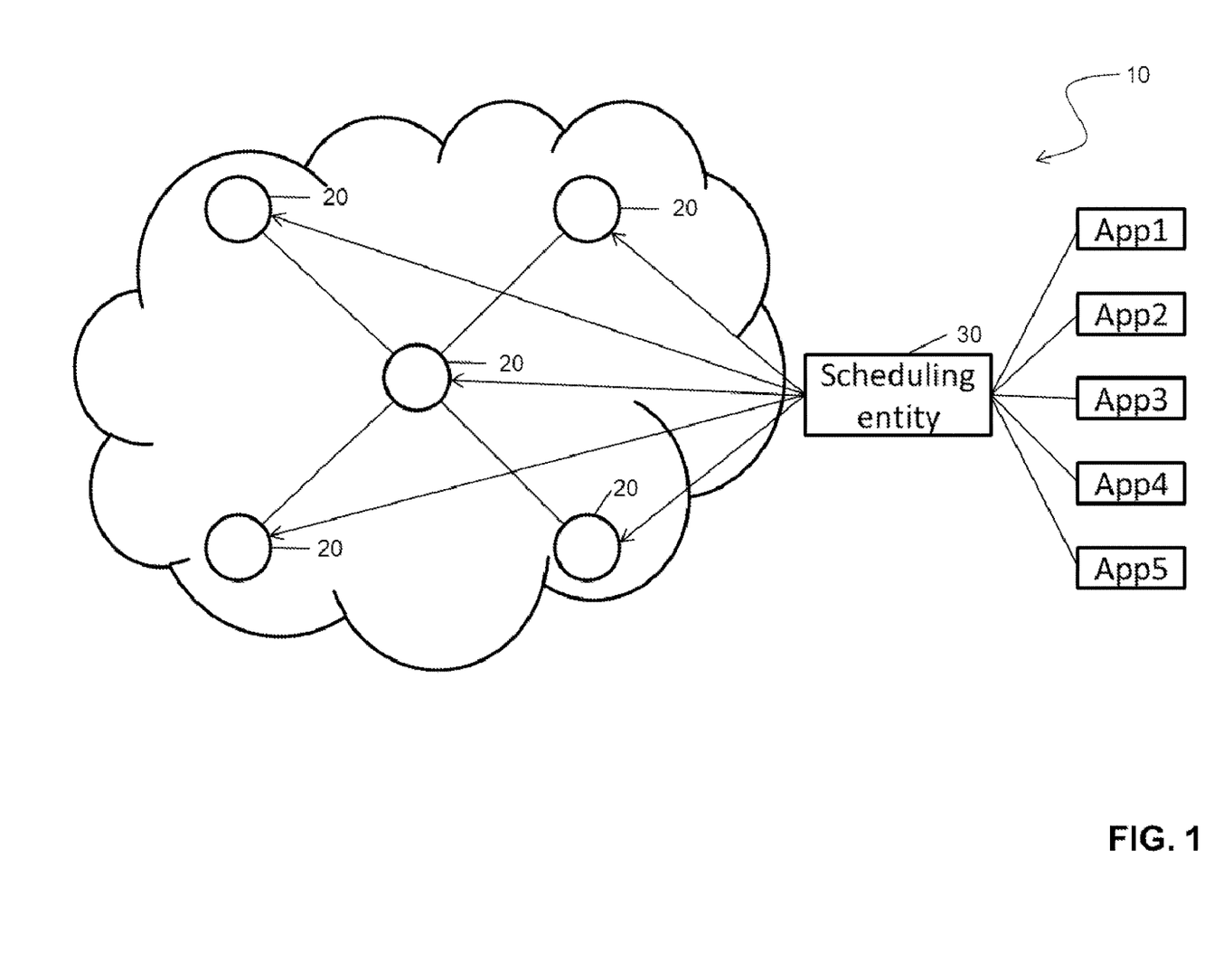
FIG. 1 schematically illustrates a datacenter environment including a scheduling entity.

FIG. 1 shows a schematic block diagram of an example datacenter environment 10. The datacenter environment 10 comprises multiple computing entities 20 which are coupled with each other by means of a network infrastructure for exchanging information between the computing entities 20. In order to schedule computational tasks (App1-App5) in The datacenter environment 10, i.e. host a certain computational task at one of the computing entities 20 or a subset of The computing entities 20 (in case that multiple computing entities 20 have to process the computational task), the datacenter environment 10 comprises a scheduling entity 30. The scheduling entity 30 is adapted to select one or more computing entities 20 for performing a certain computational task.

Figure 2:
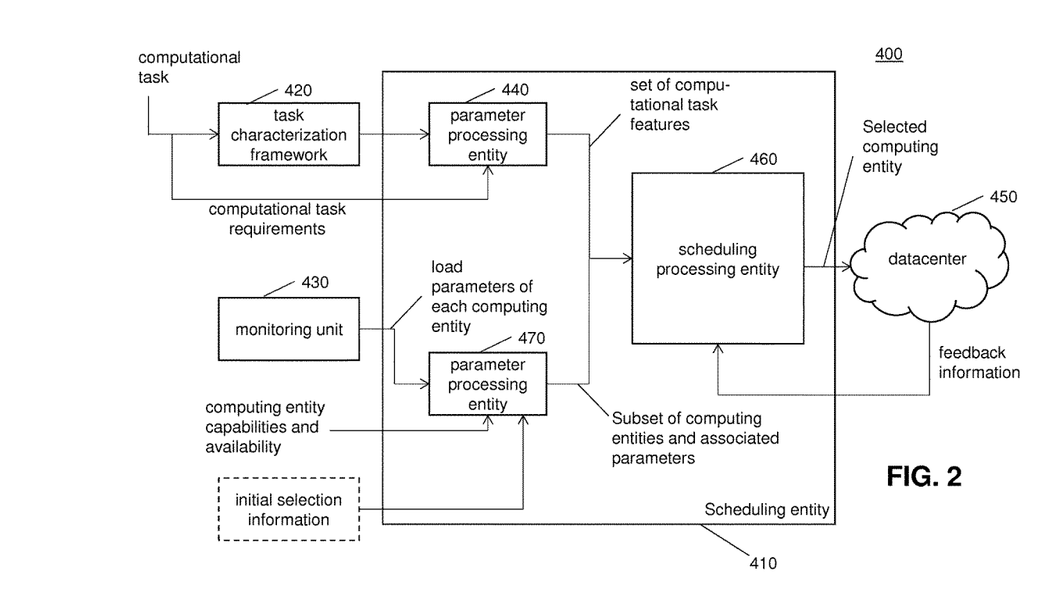
FIG. 2 schematically illustrates a first embodiment of an automated scheduling system according to the present invention.

FIG. 2 illustrates a basic scheduling system environment 400 for scheduling computational tasks in datacenter environments by means of a schematic block diagram. The system 400 comprises a scheduling entity 410. The scheduling entity 410 is adapted to receive a plurality of parameters based on which the one or more (in case of a computational task requires multiple computing entities) computing entities are selected for executing a certain computational task to be processed or executed. Scheduling entity 410 may be implemented in the form of program 300 running on server computer 200 of networked computers system 100, as shown in FIG. 4 and as discussed in detail, above.

First, the scheduling entity 410 may receive computational task parameters. The computational task parameters may refer to a certain computational task and may specify certain characteristics of the computational task. For example, the computational task may be an application and the computational task parameters may be the number of instructions executed by the application, number of memory accesses etc. The computational task parameters may also include more sophisticated parameters, for example, the usage of the central processing unit (CPU) or the memory usage.

According to another embodiment, the computational task may also be constituted by a virtual machine to be instantiated in a datacenter environment. In that case, the computational task parameters may be, for example, performance parameters of the virtual machine (for example, CPU, memory).

For example, the parameters may be derived by a task characterization framework 420. The task characterization framework 420 may be adapted to extract computational task parameters out of general computational task information. For example, the task characterization framework 420 may receive an executable command or an executable software code. The task characterization framework 420 interprets the received computational task information thereby obtaining one or more computational task parameters which are provided to the scheduling entity 410.

In addition, computational task requirements may be provided to the scheduling entity 410. The computational task requirements may be minimum criteria which have to be fulfilled by the computing entity for processing a certain computational task. For example, a computational task requirement may be the minimum (main) memory a certain computing entity has to provide for executing the computational task. According to another embodiment, the computational task requirement may be the minimum central processor (CPU) power for executing the computational task.

It is worth mentioning that the computational task parameters and the computational task requirements are related to a certain computational task, i.e. for each computational task to be scheduled in the datacenter 450, a different set of computational task parameters/computational task requirements has to be considered.

In addition, the scheduling entity 410 receives information regarding computing entities included in the datacenter 450. The information may be in the following referred to as computing entity parameters. The computing entities, in the following also referred to as nodes may be, for example, physical servers or computers on which the computational tasks may be executed or processed. A first set of computing entity parameters may be time-variant parameters, for example, actual CPU load, number of applications running on the computing entity, available memory size etc. The time-variant computing entity parameters may be provided by a monitoring unit 430. The monitoring unit 430 may be coupled with the computing entities included in the datacenter 450 and information regarding the load of the respective computing entity may be transmitted to the monitoring unit 430.

A second set of computing entity parameters may be time-invariant or essentially time-invariant parameters, for example, CPU clock rate, CPU-type, memory size, hardware architecture properties etc. The time-invariant parameters may be inherent computing entity parameters which may be provided to the scheduling entity 410 for making a scheduling selection (i.e. a decision which computing entity should be selected) based on the parameters.

It is worth mentioning that the computing entity parameters, specifically the first and second set of computing entity parameters are related to a certain computing entity, i.e. for each computing entity included in the datacenter 450, a different set of computing entity parameters has to be considered.

Before scheduling a certain computational task, initial selection information may be taken into account. The initial selection information may be defined for the scheduling of tasks in the datacenter environment. For example, for the datacenter environment, certain policies may be specified, for example by a datacenter administrator. In order to comply with the policies, the scheduling of a certain computational task may be performed by taking initial selection information into account which includes rules of the policies. For example, a datacenter administrator might wish to impose a certain maximum number of applications per computing entity which is included in the initial selection information. In order to comply with that rule, computing entities are filtered from the list of potential computing entities that already have the maximum number of applications running on them.

In machine learning in general, it is common for the characterizing features influencing a certain process to be modified such that the machine learning algorithm can better take advantage of them. Specifically, The modification may take one of two forms:

FORM 1. Adding a new feature that is some transformation of an existing feature (for example, for a feature that is a numeric value, scaling the values of that feature across entries to some bounded interval, or applying a function, such as a square, logarithm, exponentiation, etc.). The original feature may be eliminated in the transformation process (but not necessarily).

FORM 2. Combining two or more existing features via a function (for example, the product of two or more features, the ratio of two features, etc.).

These modification steps can be applied iteratively, with features that were "new" features in one step becoming "existing" features for future steps.

Finally, from a large set of original and/or enriched features only a smaller number of representative features may be selected in order to improve the machine learning process.

As shown in FIG. 2, the scheduling entity 410 may comprise a first parameter processing entity 440. The first parameter processing entity 440 may receive the computational task parameters. The parameter processing entity 440 is adapted to process the received computational task parameters in order to obtain modified computational task parameters. The modified computational task parameters may be transmitted to a scheduling processing entity 460. As mentioned before, the parameter processing entity 440 may be adapted to modify (by scaling, applying a mathematical function etc.) computational task parameters, combine two or more computational task parameters in order to obtain a new computational task parameter, adapt at least one computational task parameter and add The adapted computational task parameter alongside the original computational task parameter or otherwise modify the computational task parameters. Alternatively or in addition, the first parameter processing entity 440 may select a subgroup of computational task parameters and provide. The subgroup of parameters to the scheduling processing entity 460. Thereby, the machine learning process could be improved.

Furthermore, the scheduling entity 410 may comprise a second parameter processing entity 470. The second parameter processing entity 470 may receive the computing entity parameters, specifically, the first and second set of computing entity parameters. The parameter processing entity 470 is adapted to process the received computing entity parameters in order to obtain modified computational task parameters. The modified computing entity parameters may be transmitted to a scheduling processing entity 460. Similar to the first parameter processing entity 440, the second parameter processing entity 470 may be adapted to modify (by scaling, applying a mathematical function etc.) the first and/or second set of computing entity parameters, combine two or more parameters of the first and/or second set of computing entity parameters in order to obtain a new parameter, adapt at least one computing entity parameter and add The adapted computing entity parameter alongside the original computing entity parameter or otherwise modify the first and/or second set of computing entity parameters. Alternatively or in addition, the second parameter processing entity 470 may select a subgroup of first and/or second set of computing entity parameters and provide the subgroup of parameters to the scheduling processing entity 460. Thereby, the machine learning process could be improved.

The scheduling processing entity 460 may implement a machine-based algorithm for selecting a certain computing entity based on the (modified) computing entity parameters and the (modified) computational task parameters. Thereby, also previous selections made in the past, in the following also referred to as decisions, may be taken into account. In other words, the scheduling processing entity 460 may be adapted to learn in time to choose an advantageous computing entity.

The scheduling processing entity 460 may use a machine learning technique which is adapted to learn from previous decisions and make an actual selection of computing entity based on knowledge obtained from the previous decisions. Furthermore, the scheduling processing entity 460 may be configured to adapt to contextual changes dynamically thereby taking also workload and computational power (CPU clock/architecture, size of memory etc.) of the computational entities into account.

The scheduling processing entity 460 may take the decision based on (modified) computing entity parameters and (modified) computational task parameters based on knowledge from prior decisions, which computing entity (specified by the computing entity parameters) may provide an advantageous performance for such computational task (specified by the computational task parameters). For example, the (modified) computing entity parameters may provide information regarding the available computing entities, their computational power and the actual workload of the computing entities. The (modified) computational task parameters (for example, number of instructions, memory requirements etc.) may provide information regarding the computational task to be processed by one or more computing entities of the datacenter.

In order to be able to take knowledge gained from previous decisions into account, the datacenter may provide during or after the execution of a computational task feedback information to the scheduling processing entity 460. The feedback information may comprise information derived during the execution of the computational task, for example, consumed electrical power, CPU usage and/or performance bottlenecks, which is in the following also referred to as reward. Furthermore, the feedback information may comprise information regarding which computing entity was performing the computational task. In addition, the feedback information may comprise information regarding the (modified) computing entity parameters and the (modified) computational task parameters which was used for selecting the computing entity. The information upon which the feedback information is based will sometimes herein be referred to as "historical" information, such as "historical selections of computing entities" of the datacenter used for processing "historical computing tasks," and "historical processing results." As mentioned above, in some embodiments, a "current" or "new" task, and its associated computing entity selection and processing results will change into "historical" data, to be used for feedback information purposes, when the current, or new, task is completed. In these embodiments, machine learning occurs on an on-going basis.

The scheduling processing entity 460 may comprise or may be coupled with a storage entity for storing the feedback information. The storage entity may store a history of previous selections, namely at least tuples of information, the tuples including at least information regarding the chosen decision (which kind of application (in general computing task) has been performed on which computing entity) and information regarding the reward of the decision. Based on The history, the scheduling processing entity 460 may be able to provide improved computational task allocations. For example, the reward may be a measure for the processing time of a computational task. Specifically, the reward value may be inversely proportional to the processing time required for processing/executing the computational task.

According to another embodiment, the reward may be a measure for the energy consumption of the computing entity processing the computational task. Specifically, the reward value may be inversely proportional to the energy consumption required for processing/executing the computational task.

The scheduling processing entity 460 may be adapted to implement a multi-armed bandit model for automatically making selections based on (modified) computing entity parameters, (modified) computational task parameters and the feedback information. Multi-armed bandit model algorithms in general are known.

According to a first embodiment, the scheduling processing entity 460 may take only previous decisions into account which refer to identical previous decisions, i.e. which were made for computing task allocations for identical computing tasks (specified by identical computing task parameter) and identical computing entities (specified by identical computing task parameter).

According to preferred embodiments, the scheduling processing entity 460 may not only take identical previous decisions into account but may implement a contextual model, i.e. a model which may use similar previous decisions for making an actual decision. For example, previous decisions may be taken into account which refer to the allocation of a computational task which is similar to the present computational task to be scheduled in the datacenter environment. More in detail, when scheduling an application A in the datacenter, the scheduling processing entity 460 may not only consider past choices made for the same application A, but also choices made for applications B that are similar to A. The similarity may be defined based on computing task parameters of The applications (in general, computing tasks) provided to the scheduling processing entity 460, for example, number of instructions, average CPU usage, average memory usage etc.

In addition, the scheduling processing entity 460 may also implement a contextual model which not only considers decisions being hosted/executed on identical computing entities but also similar computing entities. Specifically, for scheduling a computational task A at a computing entity C, the scheduling processing entity 460 may not only consider past decisions that assigned computational task A to computing entity C, but also past decisions which assigned computational task A to computing entity D, wherein computing entity D is similar to computing entity C in terms of extracted computing entity features. Thereby, the scheduling processing entity 460 may learn not only from identical past selections but also from similar past selections. In addition, also combinations of the upper-mentioned contextual selection schemes are possible, i.e. an actual decision may be based on previous decisions regarding a similar computational task and similar computing entities.

Depending on the respective situation, the scheduling of computational tasks may pursue different targets, for example, reducing the processing time of a computational task or reducing the energy consumption. In other words, the selection of a computing entity has to be performed based on different objectives to be achieved by the scheduling process. Therefore, the selection algorithm for selecting a computing entity is adapted based on the given objective to be achieved. For example, information may be provided to the scheduling processing entity 460, the information characterizing the goal or objective which should be achieved by the scheduling process. Based on The information, the scheduling processing entity 460 may make a decision for selecting a certain computing entity.

Figure 3:
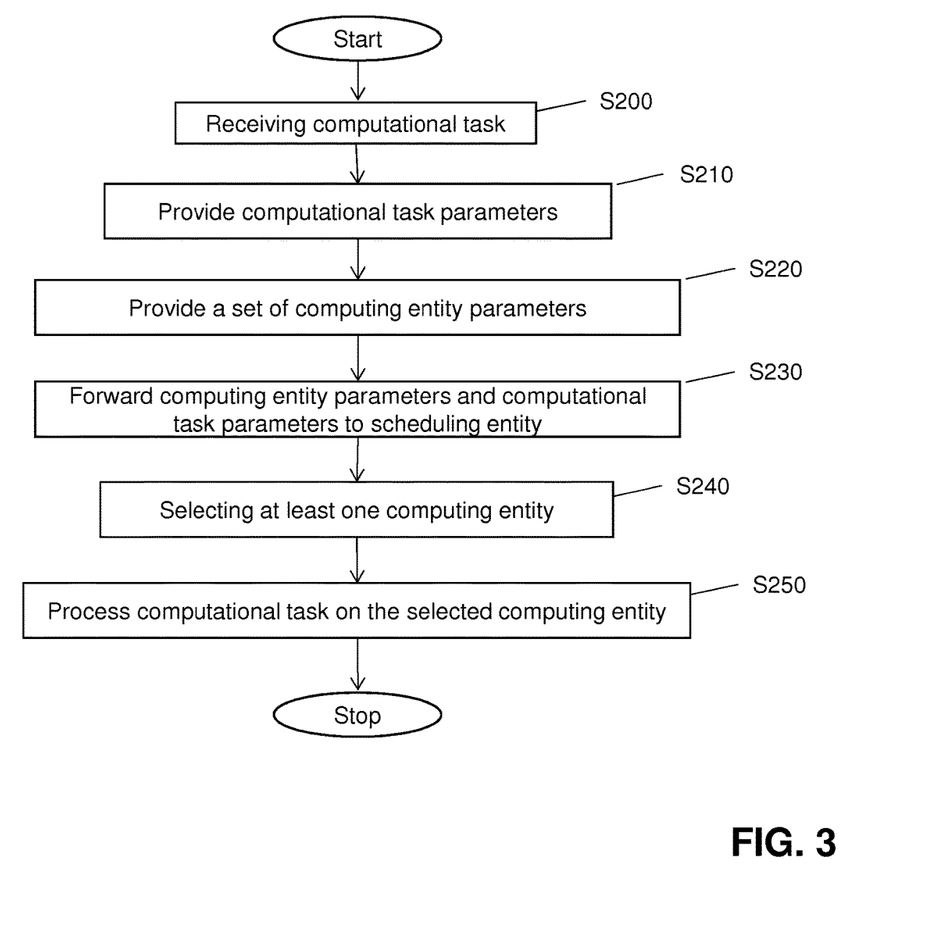
FIG. 3 is a flowchart showing a first embodiment of an automated scheduling method according to the present invention.

FIG. 3 illustrates a method for scheduling a computational task in a datacenter environment including multiple computing entities. First, a computational task to be processed by the datacenter environment is received S200. In addition, a set of computational task parameters may be provided S210, The computational task parameters specifying characteristics of the computational task to be processed. Furthermore, a set of computing entity parameters may be provided S220, where the computing entity parameters specify characteristics of the computing entities. The computational task parameters and the computing entity parameters may be forwarded to a scheduling entity S230.

In variants, the set of computing entity parameters provided may specify characteristics of those computing entities that are actually available to process the computational task. In other words, a pre-selection of the relevant entities may occur upstream the selection step S240 described below.

After receiving the computational task parameters and the computing entity parameters, the scheduling entity may select one or more computing entities of the plurality of computing entities for processing the computational task S240. The selection is based on the set of computational task parameters, the set of computing entity parameters and feedback information gathered from previous computational task schedulings. As the earlier, feedback information is gathered, prior to the step of selecting computing entities, from previous steps of selecting entities (for scheduling previous computational task(s)) and processing such previous computational task(s). As otherwise illustrated above, feedback information may encode one or more of the following: parameters, data, models, etc., which were derived upon processing previous computational task(s) on previously selected entities, e.g., during or after execution of previous computational task(s).

Finally, the computational task may be processed on the selected at least one computing entity S250.

The foregoing description of embodiments has been presented for purposes of illustration and description. It is not intended to be exhaustive or to limit embodiments of the present invention to the precise form disclosed. Modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations without leaving the scope of the underlying principle ideas.

III. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented machine learning method for scheduling a computational task by a scheduling entity in a datacenter environment, wherein the datacenter includes a plurality of computing entities and the scheduling entity includes a first and second parameter processing entities, the method comprising:
receiving feedback information from the datacenter by the scheduling entity, wherein the feedback information includes:
historical selections of the plurality of computing entities for processing historical computing tasks, and
historical processing results of the historical computing tasks as processed by the historical computing entities;
receiving and processing at the first parameter processing entity incoming data corresponding to a new computational task to be processed by the datacenter environment, wherein the incoming data includes:
a set of computational task parameters specifying characteristics of the new computational task, and
a set of computational tasks requirements specifying criteria which have to be fulfilled by a computer entity for processing the new computational task;
receiving and processing at the second parameter processing entity a first and second set of computing entity parameters;
wherein the first set of computing entity parameters specifies characteristics of the computing entities of the plurality of computing entities, and the second set of computing entity parameters specifies load parameters of the plurality of computing entities;
providing processing result from the first and second parameter processing entities to machine logic of the scheduling entity;
identifying, by a self-learning mechanism of the scheduling entity based on the processing result and the feedback information, features from one or more computing entities among the plurality of computing entities that have similar characteristics to the received set of computing entity parameters in the processing result;
creating a contextual model that corresponds to the identified features of the one or more of the computing entities;
responsive to detecting changes in the information deriving from the received feedback information, the processing result from the first and second parameter processing entities, and the created contextual model, modifying the set of identified features by increasing or decreasing the effect of one or more parameters;
selecting, by machine logic of the scheduling entity, one or more computing entities of the plurality of computing entities for processing the new computational task based, at least in part, upon:
the processing result from the first parameter processing entity,
the processing result from the second parameter entity,
the received feedback information, and
the created contextual model; and
processing the computational task on the selected one or more computing entities.

2. The method according to claim 1, further comprising:
continuously refining, by the scheduling entity, the scheduling process by integrating feedback information on an ongoing basis as additional new computing tasks are scheduled over time.

3. The method according to claim 1, wherein the self-learning mechanism includes a self-learning scheduling mechanism capability that takes into account the feedback information, in the selection of the selected one or more computing entities.

4. The method according to claim 3, wherein the self-learning scheduling mechanism capability is adapted to take into account computational task parameters and computing entity parameters used in previous steps of selecting one or more computing entities for the purpose of scheduling a previous computational task in the datacenter environment.

5. The method according to claim 1, wherein the scheduling entity includes a multi-armed bandit model for selecting the one or more computing entities.

6. The method according to claim 1, wherein the scheduling entity includes a contextual self-learning mechanism capability taking into account the feedback information that was derived from processing of computational tasks with computational task parameters that are similar to computational task parameters of a current computational task to be scheduled.

7. The method according to claim 1, wherein the scheduling entity includes a contextual self-learning mechanism capability taking into account feedback information that was derived from processing computational tasks on one or more computing entities with computing entity parameters that are similar to computing entity parameters of a currently selected computing entity.

8. The method according to claim 1, wherein the scheduling entity, the first parameter processing entity, and the second parameter processing entity receive the set of computational task parameters and selecting a subset of the computational task parameters that are taken into account for selecting the one or more computing entities.

9. The method according to claim 1, wherein the scheduling entity, the first parameter processing entity, and the second parameter processing entity receive the computational task parameters and adapt to modify the computational task parameters by applying an arithmetic operation or generate a modified computational task parameter by combining two or more computational task parameters based on an arithmetic operation or adapt at least one computational task parameter and add the adapted computational task parameter alongside with the original computational task parameter.

10. The method according to claim 1, wherein the scheduling entity, the first parameter processing entity, and the second parameter processing entity receive the computing entity parameters and modify the computing entity parameters by applying an arithmetic operation, or generate a modified computing entity parameter by combining two or more computing entity parameters based on an arithmetic operation or adapt at least one computing entity parameter and add the adapted computing entity parameter alongside with the original computing entity parameter.

11. The method according to claim 1, wherein a subset of computing entities out of the plurality of computing entities is selected based on computational task requirements.

12. The method according to claim 1, wherein selecting the one or more computing entities is based on one or more optimization characteristics, wherein the one or more optimization characteristics define one or more datacenter parameters to be improved by the scheduling entity.

13. A machine learning computer program product for scheduling a computational task by a scheduling entity in a datacenter environment, wherein the datacenter includes a plurality of computing entities and the scheduling entity includes a first and second parameter processing entities, the computer program product comprising a non-transitory computer readable storage medium having stored thereon:
first program instructions programmed to receive feedback information from the datacenter by the scheduling entity, wherein the feedback information includes:
historical selections of the plurality of computing entities for processing historical computing tasks, and
historical processing results of the historical computing tasks as processed by the historical computing entities;
second program instructions programmed to receive and process at the first parameter processing entity incoming data corresponding to a new computational task to be processed by the datacenter environment, wherein the incoming data includes:
a set of computational task parameters specifying characteristics of the new computational task, and
a set of computational tasks requirements specifying criteria which have to be fulfilled by a computer entity for processing the new computational task;
third program instructions programmed to receive and process at the second parameter processing entity a first and second set of computing entity parameters:
wherein the first set of computing entity parameters, specifies characteristics of the computing entities of the plurality of computing entities, and the second set of computing entity parameters specifies load parameters of the plurality of computing entities;
fourth program instructions to provide processing result from the first and second parameter processing entities to machine logic of the scheduling entity;
fifth program instructions programmed to identify, by a self-learning mechanism of the scheduling entity based on the processing result and the feedback information, features from one or more computing entities among the plurality of computing entities that have similar characteristics to the received set of computing entity parameters in the processing result;
sixth program instructions programmed to create a contextual model that corresponds to the identified features of the one or more of the computing entities;
responsive to detecting changes in the information deriving from the received feedback information, the received incoming data, the processing result from the first and second parameter processing entities, and the created contextual model, seventh program instructions to modify the set of identified features by increasing or decreasing the effect of one or parameters; and
eighth program instructions programmed to select, by machine logic of the scheduling entity, one or more computing entities of the plurality of computing entities for processing the new computational task based, at least in part, upon:
the processing result from the first parameter processing entity,
the processing result from the send parameter entity,
the received feedback information, and
the created contextual model; and
ninth program instructions programmed to process the computational task on the selected one or more computing entities.

14. A machine learning computer system for scheduling a computational task by a scheduling entity in a datacenter environment, wherein the datacenter includes a plurality of computing entities and the scheduling entity includes a first and second parameter processing entities, the computer system comprising:
a processor(s) set; and
a computer readable storage medium;
wherein:
the processor set is structured, located, connected and/or programmed to run program instructions stored on the computer readable storage medium; and
the program instructions include:
first program instructions programmed to receive feedback information from the datacenter by scheduling entity, wherein the feedback information includes:
historical selections of the plurality of computing entities for processing historical computing tasks, and
historical processing results of the historical computing tasks as processed by the historical computing entities;
second program instructions programmed to receive and process at the first parameter processing entity incoming data corresponding to a new computational task to be processed by the datacenter environment, wherein the incoming data includes:

a set of computational task parameters specifying characteristics of the new computational task, and a set of computational tasks requirements specifying criteria which have to be fulfilled by a computer entity for processing the new computational task;

third program instructions programmed to receive and process at the second parameter processing entity a first and second set of computing entity parameters:

wherein the first set of computing entity parameters, specifies characteristics of the computing entities of the plurality of computing entities, and the second set of computing entity parameters specifies load parameters of the plurality of computing entities;

fourth program instructions to provide processing result from the first and second parameter processing entities to machine logic of the scheduling entity;

fifth program instructions programmed to identify, by a self-learning mechanism of the scheduling entity based on the processing result and the feedback information, features from one or more computing entities among the plurality of computing entities that have similar characteristics to the received set of computing entity parameters in the processing result;

sixth program instructions programmed to create a contextual model that corresponds to the identified features of the one or more of the computing entities;

responsive to detecting changes in the information deriving from the received feedback information, the received incoming data, the processing result from the first and second parameter processing entities, and the created contextual model, seventh program instructions to modify the set of identified features by increasing or decreasing the effect of one or parameters; and eighth program instructions programmed to select, by machine logic of the scheduling entity, one or more computing entities of the plurality of computing entities for processing the new computational task based, at least in part, upon:

the processing result from the first parameter processing entity, the processing result from the send parameter entity, the received feedback information, and the created contextual model; and ninth program instructions programmed to process the computational task on the selected one or more computing entities.

* * * * *